(12) United States Patent
Yi et al.

(10) Patent No.: US 11,882,550 B2
(45) Date of Patent: *Jan. 23, 2024

(54) METHOD AND APPARATUS FOR DEFINING BASIC RESOURCE UNIT FOR NB-IOT USER EQUIPMENT IN WIRELESS COMMUNICATION SYSTEM

(71) Applicant: LG ELECTRONICS INC., Seoul (KR)

(72) Inventors: Yunjung Yi, Seoul (KR); Kijun Kim, Seoul (KR); Seunggye Hwang, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 75 days.

This patent is subject to a terminal disclaimer.

(21) Appl. No.: 17/712,728

(22) Filed: Apr. 4, 2022

(65) Prior Publication Data

US 2022/0232543 A1 Jul. 21, 2022

Related U.S. Application Data

(63) Continuation of application No. 16/065,634, filed as application No. PCT/KR2016/015327 on Dec. 27, 2016, now Pat. No. 11,330,582.

(Continued)

(51) Int. Cl.
*H04W 72/044* (2023.01)
*H04L 5/00* (2006.01)
*H04L 67/12* (2022.01)

(52) U.S. Cl.
CPC ......... *H04W 72/044* (2013.01); *H04L 5/0007* (2013.01); *H04L 5/0055* (2013.01); *H04L 67/12* (2013.01)

(58) Field of Classification Search
CPC .. H04W 72/044; H04L 5/0007; H04L 5/0055; H04L 67/12; H04L 5/0012;

(Continued)

(56) References Cited

U.S. PATENT DOCUMENTS

2009/0203383 A1 8/2009 Shen et al.
2011/0310856 A1 12/2011 Hariharan et al.

(Continued)

OTHER PUBLICATIONS

Ericsson et al., "Pseudo CR 45.820-Narrowband LTE Uplink Physical Layer Design (revision of GP-150965)", Aug. 10-14, 2015. (From Applicant's IDS) (Year: 2015).*

(Continued)

*Primary Examiner* — Mang Hang Yeung
(74) *Attorney, Agent, or Firm* — LEE, HONG, DEGERMAN, KANG & WAIMEY

(57) ABSTRACT

A method and apparatus for performing transmission in a wireless communication system is provided. A narrowband internet-of-things (NB-IoT) user equipment (UE) transmits a physical uplink shared channel (PUSCH) to a network by using a first resource unit, and transmits an acknowledgement/non-acknowledgement (ACK/NACK) to the network by using a second resource unit. The first resource unit for PUSCH transmission consists of a first number of resource elements (REs) within a first tone in frequency domain and a first time interval in time domain. The second resource unit for ACK/NACK transmission also consists of a second number of REs within a second tone in frequency domain and a second time interval in time domain. The second number is smaller than the first number.

20 Claims, 17 Drawing Sheets

Related U.S. Application Data

(60) Provisional application No. 62/318,763, filed on Apr. 6, 2016, provisional application No. 62/298,971, filed on Feb. 23, 2016, provisional application No. 62/274,732, filed on Jan. 4, 2016, provisional application No. 62/271,299, filed on Dec. 27, 2015.

(58) Field of Classification Search
CPC ... H04L 5/0057; H04L 5/0044; H04L 5/0046; H04L 5/0053; Y02D 30/70
USPC .......................................................... 370/330
See application file for complete search history.

(56) References Cited

U.S. PATENT DOCUMENTS

| | | | |
|---|---|---|---|
| 2013/0156011 A1* | 6/2013 | Suzuki | H04W 72/04 370/335 |
| 2014/0369297 A1 | 12/2014 | Bertrand et al. | |
| 2018/0167169 A1* | 6/2018 | Takeda | H04L 1/08 |
| 2019/0261310 A1* | 8/2019 | Martin | H04W 72/0446 |
| 2021/0195567 A1 | 6/2021 | Yi et al. | |

OTHER PUBLICATIONS

PCT International Application No. PCT/KR2016/015327, International Search Report dated Mar. 30, 2017, 2 pages.
G Electronics, "Discussions on uplink design for NB-IoT", R1-156884, 3GPP TSG RAN WG1 Meeting #83, Nov. 2015, 5 pages.
Samsung, "HARQ-ACK Multiplexing with Data/SR/P-CSI", R1-156746, 3GPP TSG RAN WG1 #83, Nov. 2015, 2 pages.
U.S. Appl. No. 16/065,634, Office Action dated Apr. 6, 2021, 9 pages.
U.S. Appl. No. 16/065,634, Final Office Action dated Jul. 13, 2021, 13 pages.
European Patent Office Application Serial No. 16882066.0, Search Report dated Jul. 19, 2019, 8 pages.
Ericsson, et al., "Pseudo CR45.820—Narrowband LTE Uplink Physical Layer Design (revision of GP-150965)", 3GPP TSG GERAN Meeting #65, GP-151002, Aug. 2015 9 pages.
Ericsson, "NB-IoT—UL Designs", 3GPP TSG RAN WG1 Meeting #83, R1-157423, Nov. 2015, 7 pages.

* cited by examiner

FIG. 8

| 0 | | | | 10 | | | |
|---|---|---|---|---|---|---|---|
| 1 | | 6 | | 11 | | 16 | |
| 2 | 5 | 7 | 9 | 12 | 15 | 17 | 19 |
| 3 | | 8 | | 13 | | 18 | |
| 4 | | | | 14 | | | |

METHOD AND APPARATUS FOR DEFINING BASIC RESOURCE UNIT FOR NB-IOT USER EQUIPMENT IN WIRELESS COMMUNICATION SYSTEM

CROSS-REFERENCE TO RELATED APPLICATIONS

This application is a continuation of U.S. patent application Ser. No. 16/065,634, filed on Jun. 22, 2018, which is the National Stage filing under 35 U.S.C. 371 of International Application No. PCT/KR2016/015327, filed on Dec. 27, 2016, which claims the benefit of U.S. Provisional Application No. 62/271,299, filed on Dec. 27, 2015, 62/274,732, filed on Jan. 4, 2016, 62/298,971, filed on Feb. 23, 2016 and 62/318,763, filed on Apr. 6, 2016, the contents of which are all hereby incorporated by reference herein in their entirety.

BACKGROUND OF THE INVENTION

Field of the Invention

The present invention relates to wireless communications, and more particularly, to a method and apparatus for defining a basic resource unit for a narrowband internet-of-things (NB-IoT) user equipment (UE) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

In the future versions of the LTE-A, it has been considered to configure low-cost/low-end (or, low-complexity) user equipments (UEs) focusing on the data communication, such as meter reading, water level measurement, use of security camera, vending machine inventory report, etc. For convenience, these UEs may be called machine type communication (MTC) UEs. Since MTC UEs have small amount of transmission data and have occasional uplink data transmission/downlink data reception, it is efficient to reduce the cost and battery consumption of the UE according to a low data rate. Specifically, the cost and battery consumption of the UE may be reduced by decreasing radio frequency (RF)/baseband complexity of the MTC UE significantly by making the operating frequency bandwidth of the MTC UE smaller.

Narrowband internet-of-things (NB-IoT) is a low power wide area network (LPWAN) radio technology standard that has been developed to enable a wide range of devices and services to be connected using cellular telecommunications bands. NB-IoT is a narrowband radio technology designed for the IoT, and is one of a range of mobile IoT (MIoT) technologies standardized by the 3GPP. NB-IoT focuses specifically on indoor coverage, low cost, long battery life, and enabling a large number of connected devices.

For supporting NB-IoT efficiently, it may be required to define a basic resource unit for NB-IoT.

SUMMARY OF THE INVENTION

The present invention provides a method and apparatus for defining a basic resource unit for a narrowband internet-of-things (NB-IoT) user equipment (UE) in a wireless communication system.

In an aspect, a method for performing transmission by a narrowband internet-of-things (NB-IoT) user equipment (UE) in a wireless communication system is provided. The method includes transmitting a physical uplink shared channel (PUSCH) to a network by using a first resource unit, and transmitting an acknowledgement/non-acknowledgement (ACK/NACK) to the network by using a second resource unit. The first resource unit consists of a first number of resource elements (REs) within a first tone in frequency domain and a first time interval in time domain. The second resource unit consist of a second number of REs within a second tone in frequency domain and a second time interval in time domain. The second number is smaller than the first number.

In another aspect, a narrowband internet-of-things (NB-IoT) user equipment (UE) in a wireless communication system is provided. The NT-IoT UE includes a memory, a transceiver, and a processor, coupled to the memory and the transceiver, that controls the transceiver to transmit a physical uplink shared channel (PUSCH) to a network by using a first resource unit, and controls the transceiver to transmit an acknowledgement/non-acknowledgement (ACK/NACK) to the network by using a second resource unit. The first resource unit consists of a first number of resource elements (REs) within a first tone in frequency domain and a first time interval in time domain. The second resource unit consist of a second number of REs within a second tone in frequency domain and a second time interval in time domain. The second number is smaller than the first number.

Data or control transmission for NB-IoT UE can be performed efficiently by using a new basic resource unit.

BRIEF DESCRIPTION OF THE DRAWINGS

FIG. 8 shows another example of resource units for PUSCH transmission according to an embodiment of the present invention.
FIG. 9 shows another example of resource units for PUSCH transmission according to an embodiment of the present invention.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

Figure 1:
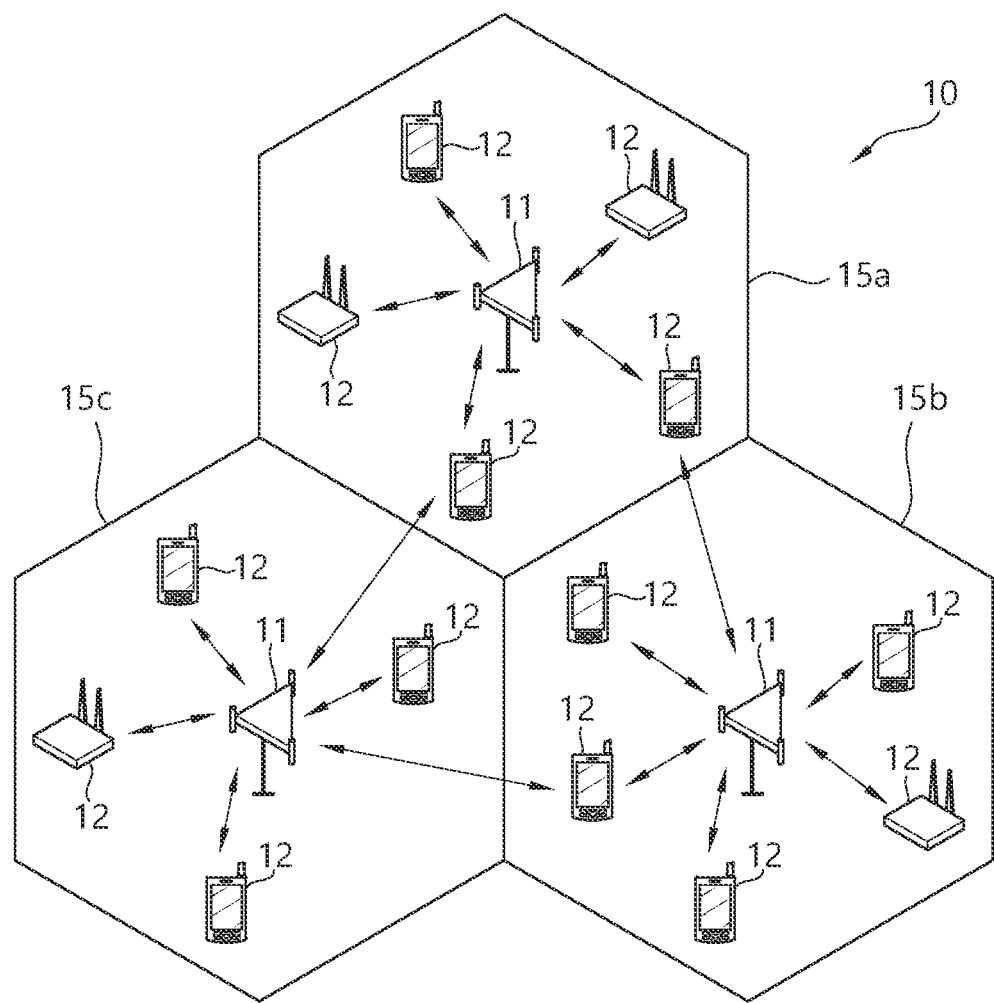
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
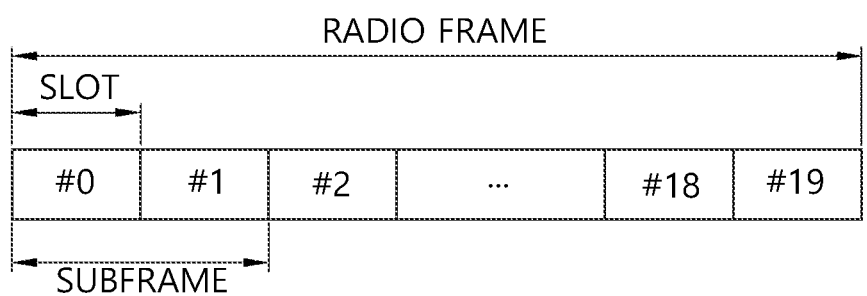
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

Figure 3:
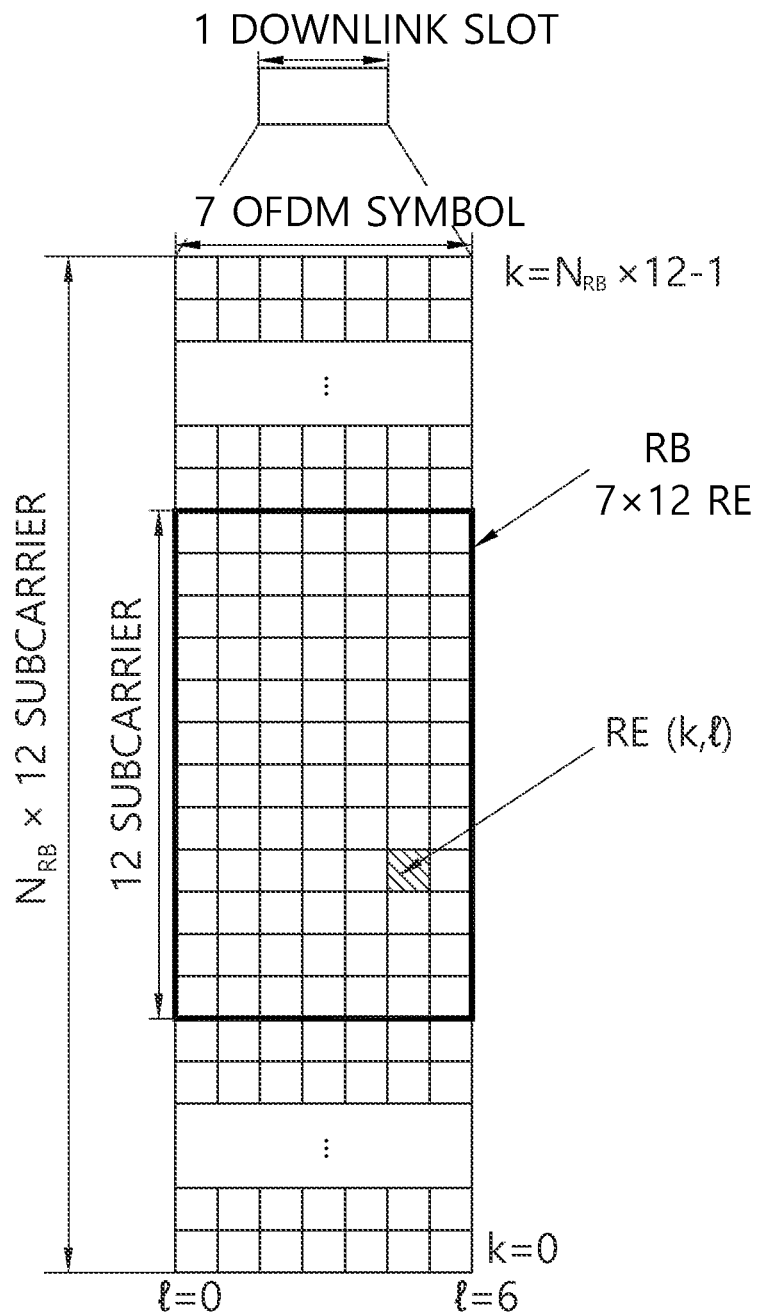
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
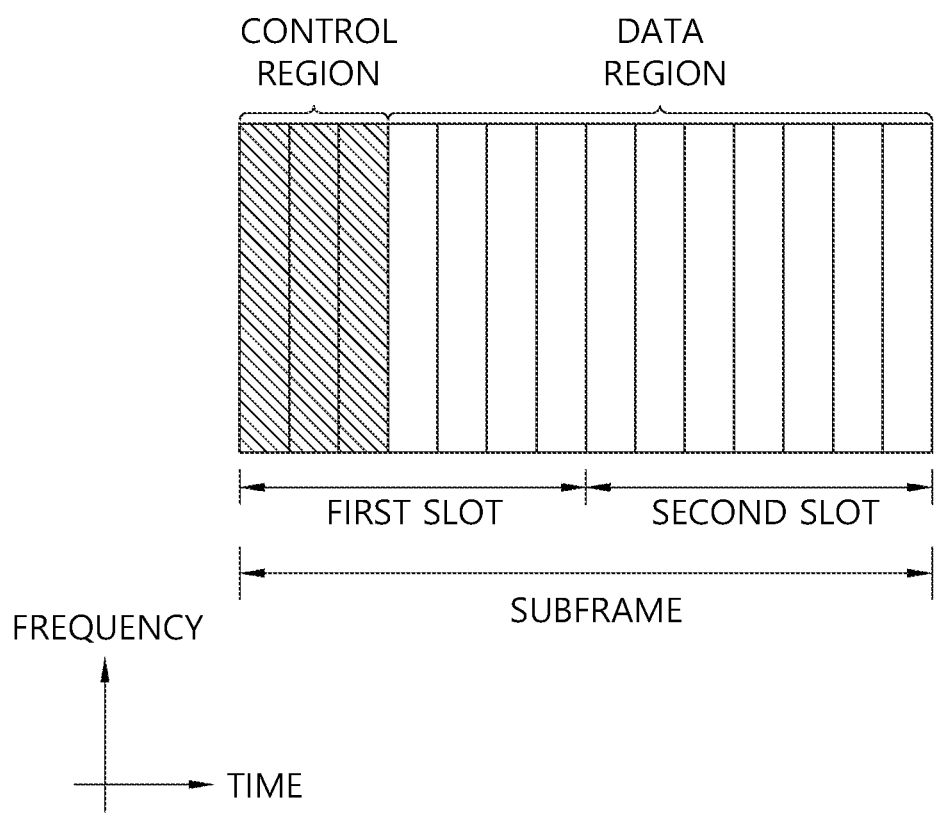
FIG. 4 shows structure of a downlink subframe.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PC-FICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (TX) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of TX power control commands on individual UEs within an arbitrary UE group, a TX power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information, a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

Figure 5:
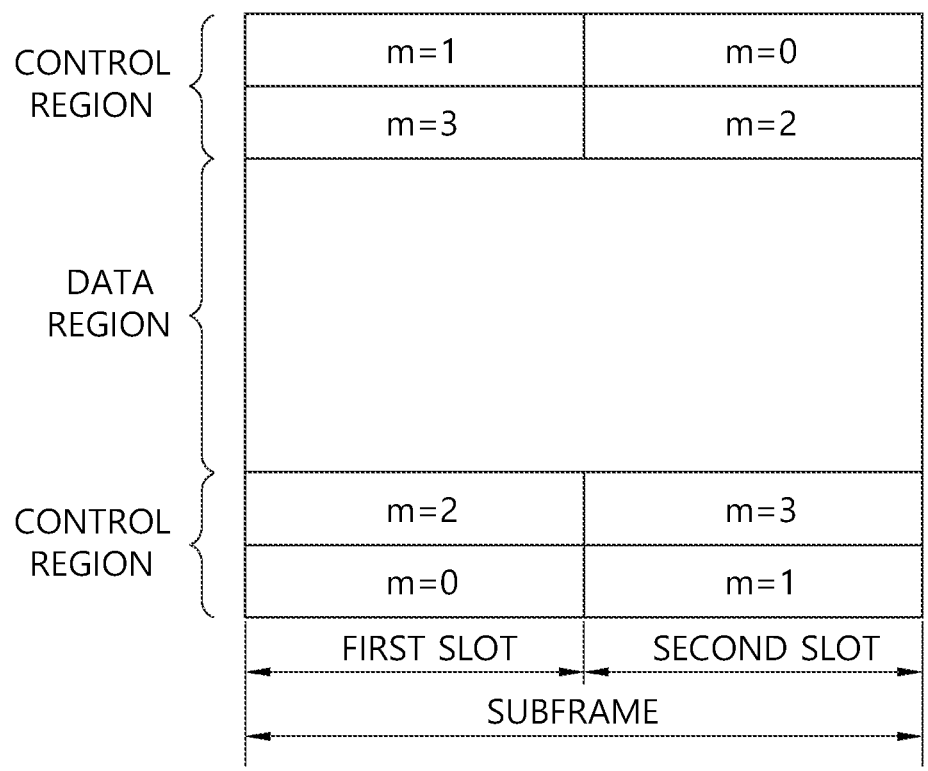
FIG. 5 shows structure of an uplink subframe.
Figure 5:
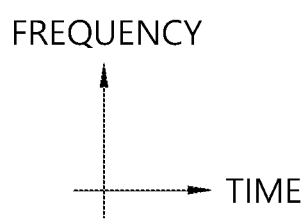

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

In the current LTE specification, all UEs shall support maximum 20 MHz system bandwidth, which requires baseband processing capability to support 20 MHz bandwidth. To reduce hardware cost and battery power of MTC UEs, reducing bandwidth is a very attractive option. To enable narrowband MTC UEs, the current LTE specification shall be changed to allow narrowband UE category. If the serving cell has small system bandwidth (smaller than or equal to bandwidth that narrow-band UE can support), the UE can attach based on the current LTE specification.

For example, a MTC UE may operate in reduced UE downlink and/or uplink bandwidth of 1.4 MHz (i.e. 6 PRBs), regardless of operating system bandwidth of a cell. A subband in which a MTC UE operates (i.e. MTC subband) may be located in a center of the system bandwidth (e.g. center 6 PRBs). Alternatively, multiple subbands in which multiples MTC UEs operates may be allocated in one subframe for multiplexing of the multiple MTC UEs. In this case, the multiple UEs may use different subbands from each other, or, may use the same subband (not center 6 PRBs).

Further, a MTC UE may operate in further reduced UE downlink and/or uplink bandwidth of 200 kHz (i.e. 1 PRB). This may be referred to as a narrowband internet-of-things (NB-IoT). Narrowband IoT (NB-IoT) may provide access to network services using physical layer optimized for very low power consumption (e.g. full carrier bandwidth is 180 kHz, subcarrier spacing can be 3.75 kHz or 15 kHz). A number of E-UTRA protocol functions supported by all Rel-8 UEs may not be used for NB-IoT and need not be supported by eNBs and UEs only using NB-IoT. In NB-IoT, the MTC UE may operate in a legacy cell which has a system bandwidth wider than 200 kHz with backward compatibility. This system may be referred to as in-band NB-LTE. Alternatively, the MTC UE may operate in a frequency, in which the legacy cell does not exist and only for the MTC UE. This system may be referred to as stand-alone NB-LTE.

Coverage enhancement (CE) for the MTC UE is described. When a UE performs initial access towards a specific cell, the UE may receive master information block (MIB), system information block (SIB) and/or radio resource control (RRC) parameters for the specific cell from an eNB which controls the specific cell. Further, the UE may receive PDCCH/PDSCH from the eNB. In this case, the MTC UE should have broader coverage than the legacy UE. Accordingly, if the eNB transmits MIB/SIB/RRC parameters/PDCCH/PDSCH to the MTC UE with same scheme as the legacy UE, the MTC UE may have difficulty for receiving MIB/SIB/RRC parameters/PDCCH/PDSCH. To solve this problem, when the eNB transmits MIB/SIB/RRC parameters/PDCCH/PDSCH to the MTC UE having coverage issue, the eNB may apply various schemes for coverage enhancement, e.g. subframe repetition, subframe bundling, etc.

When a MTC UE having coverage issue uses the same service in the same cell with a legacy UE or a MTC UE not having coverage issue, a large amount of resources may be used to transmit data to the MTC UE having coverage issue. It may restrict services for other UEs. Therefore, in order to avoid the problem that an operation for the MTC UE having coverage issue may interference an operation for other UEs, a time region for the MTC UE having coverage issue and a time region for other UEs may be multiplexed by time division multiplexing (TDM). The time region for the MTC UE having coverage issue and time region for other UEs may be multiplexed with a long-term period, e.g. tens of minutes, or with a short-term period, e.g. some subframes.

Hereinafter, a MTC UE, a UE requiring coverage enhancement (CE), a low cost UE, a low end UE, a low complexity UE, a narrow(er) band UE, a small(er) band UE, a new category UE, a bandwidth reduced low complexity UE (BL UE), NB-IoT UE, or NB-LTE UE may have the same meaning, and may be used mixed. Or, just a UE may refer one of UEs described above. Further, in the description below, a case where system bandwidth of available cells is larger than bandwidth that new category narrowband UEs can support may be assumed. For the new category UE, it may be assumed that only one narrow-band is defined. In other words, all narrow-band UE shall support the same narrow bandwidth smaller than 20 MHz. It may be assumed that the narrow bandwidth is larger than 1.4 MHz (6 PRBs). However, the present invention can be applied to narrower bandwidth less than 1.4 MHz as well (e.g. 200 kHz), without loss of generality. In these cases, the UE may be able to receive only a limited number of PRBs or subcarriers. Furthermore, in terms of UL transmission, a UE may be configured or scheduled with single or less than 12 tones (i.e. subcarriers) in one UL transmission to enhance the coverage by improving peak-to-average power ratio (PAPR) and channel estimation performance.

In NB-IoT, it is expected that different resource unit definition, compared to the conventional subframe or physical resource block, in DL and UL may be used. Hereinafter, a method for defining a basic resource unit (hereinafter, just resource unit) for NB-IoT according to embodiments of the present invention is described.

First, a resource unit definition for PUSCH transmission according to an embodiment of the present invention is described. In PUSCH transmission, in order to allow reasonable transport block (TB) size carried in one resource unit, a resource unit for NB-IoT may be considered. One resource unit may be one or some portion of one PRB in LTE, which corresponds to 14 OFDM symbols with 12 subcarriers. Regardless of whether the resource unit follows the same number of REs or not, the resource unit is expected to transmit one PUSCH.

In terms of resource unit definitions for PUSCH transmission, one of the followings may be considered.

(1) One TTI: The resource unit is used to schedule one TB. One TTI may consist of multiple resource units which may be spread over frequency and/or time. TTI may be changed dynamically depending on the scheduled resource units in time domain. Or, TTI may be fixed by higher layer configuration.

Repetition may occur in TTI level. Minimum TTI size may be configured by the network, and repetition may occur over minimum TTI. For example, minimum TTI size may be one resource unit. One resource unit may be a default value for minimum TTI. If a UE is configured with larger number of resource units than minimum TTI, repetition may occur continuously over the scheduled resource units. Otherwise, repetition may occur over minimum TTI. If scheduled resource units is smaller than the configured minimum TTI size, repetition may occur over the scheduled resource units in continuous manner. If minimum TTI is configured, resource index may be mapped within resource units in the minimum TTI. The total size of resource index may be used for data scheduling. The minimum TTI may be configured per coverage class or per UE. The minimum TTI may also be configured to achieve time-diversity. When relatively larger minimum TTI is configured, latency may increase, but time-diversity gain may be achieved.

In case of control channel, minimum TTI or the number of resource units used for control channel multiplexing may also be considered. The number of resource units used for control channel multiplexing is the size of resource units where UEs can be multiplexed. The number of resource units may be jointly signaled with repetition number. Or, the number of resource units may be inferred from transport block size (TBS). In other words, a UE may be dynamically indicted with the number of repetitions, and the UE may infer the number of resource units used in transmission based on TBS. For example, instead of indicating TBS index, actual TB size may be signaled assuming the same code rate used. Or, a table including code rate, TBS and the number of resource units may be used to indicate the resource unit size, code rate and TBS. The value range of resource units may be [1 . . . N], where N may be 6 to accommodate 100 bits. When minimum TTI is configured which is larger than one resource unit, within one minimum TTI, the scheduled resource units may be further indicated by the starting offset in resource units.

(2) One resource unit: This is similar to PRB in legacy system. One resource unit is the minimum resource block size where PUSCH can be scheduled. When single tone transmission is used, the number of bits transmittable in legacy TTI length (1 ms) is very limited. Moreover, considering PAPR issue, if binary phase shift keying (BPSK) or pi/2 BPSK is used in single tone transmission, further restriction of bit size is expected. Moreover, demodulation reference signal (DM-RS) in 1 ms (based on legacy pattern) with single tone is very short. Thus, increasing the size of resource in time (e.g. k ms) seems necessary. For example, when single tone is used for one resource unit, one resource unit may consist of single tone in k ms. Resource unit is used in resource allocation. If resource unit is multiple in frequency and time domains within one TTI, resource allocation may be jointly performed. Or, resource unit may be indexed from frequency first and then time second.

To be able to transmit reasonable TBS (e.g. minimum payload of Msg 3 transmission), one resource unit may include at least about 168 REs using BPSK and 84 REs using quadrature phase shift keying (QPSK), assuming minimum size of 56 bits. The size of k may be dependent on the number of DM-RS symbols in 1 ms. Assuming 4 OFDM symbols in 14 OFDM symbols are used for DM-RS, k may be about 16 using BPSK and 8 using QPSK. However, data mapping to allow symbol combining may be beneficial particularly in deep coverage case. Moreover, it may reduce PAPR by repeating the same data continuously. In that case, if p repetition is used for symbol combining, one resource unit may be multiple of p (i.e. k*p). This may be used only in case of BPSK is used or deep coverage case.

In summary, a resource unit may consist of REs in m subcarrier within k ms. In case of BPSK is used in single tone, k may be 16. Otherwise, k may be 8. For other values of m (i.e. m=4, 8, 12), the k may be (2, 1, 1), respectively.

Figure 6:
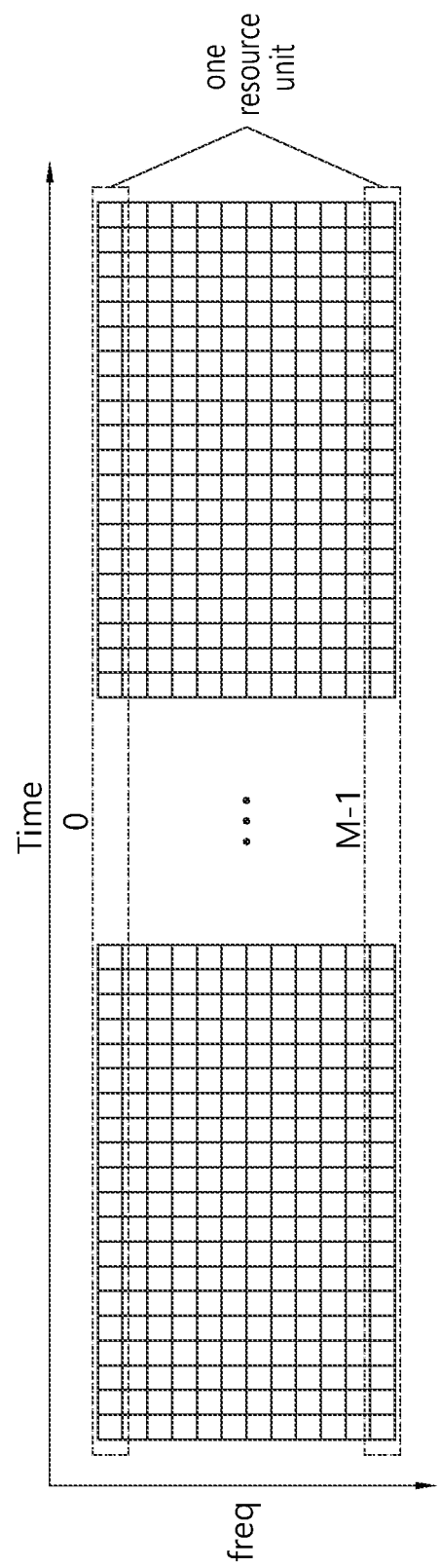
FIG. 6 shows an example of resource units for PUSCH transmission according to an embodiment of the present invention.

FIG. 6 shows an example of resource units for PUSCH transmission according to an embodiment of the present invention. FIG. 6 corresponds to a case that subcarrier spacing is 3.75 kHz. Referring to FIG. 6, one resource unit for PUSCH transmission includes a single tone across multiple subframes. Resource units are indexed from 0 to M−1.

Figure 7:
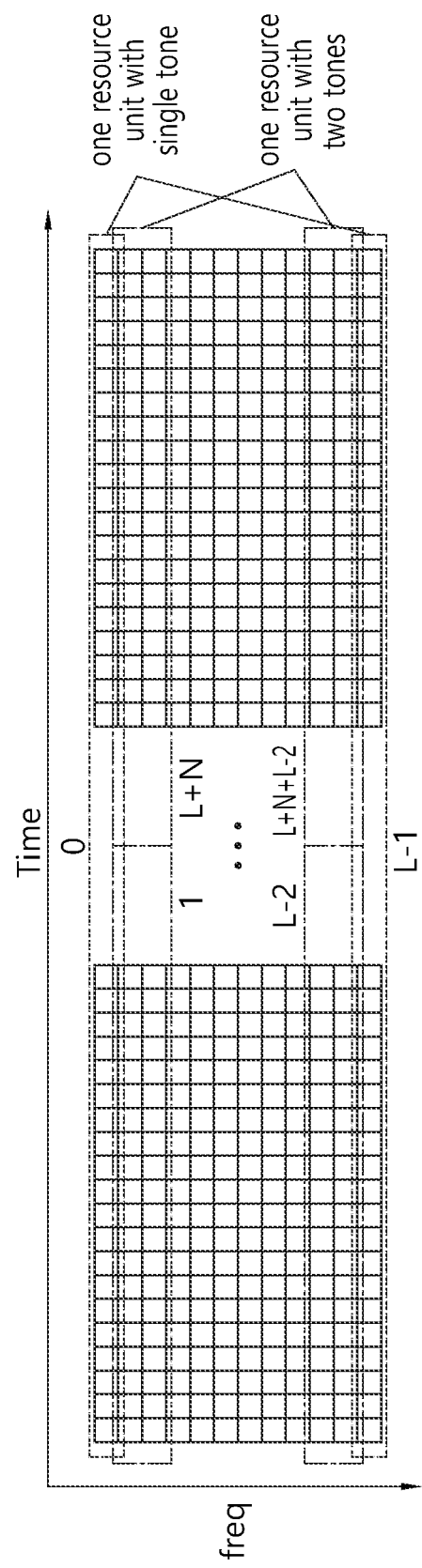
FIG. 7 shows another example of resource units for PUSCH transmission according to an embodiment of the present invention.

FIG. 7 shows another example of resource units for PUSCH transmission according to an embodiment of the present invention. FIG. 7 corresponds to a case that subcarrier spacing is 15 kHz. Referring to FIG. 7, one resource unit for PUSCH transmission may include a single tone or two tones across multiple subframes. Resource units are indexed from 0 to L−1 by frequency first, and the remaining resource units are index from L+N to L+N+L−2.

Figure 8:
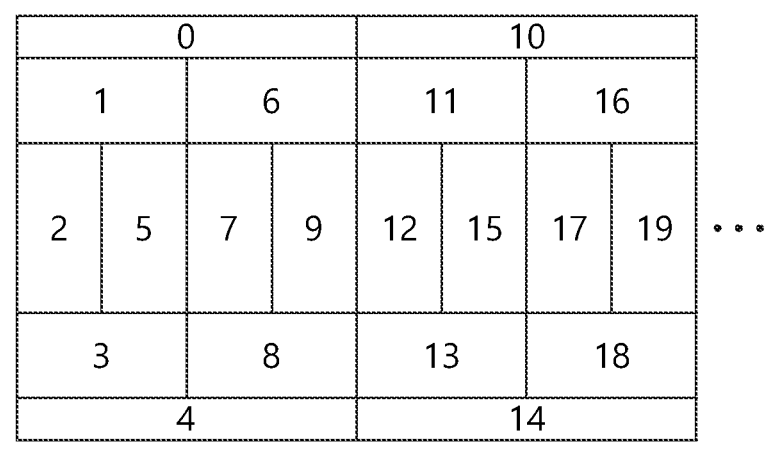

FIG. 8 shows another example of resource units for PUSCH transmission according to an embodiment of the present invention. Referring to FIG. 8, one TTI includes two resource units with single tone, two resource units with two tones and one resource unit with four tones. Resource unit with single tone occupies 20 subframes, resource unit with two tones occupies 10 subframes, and resource unit with four tones occupies 5 subframes. In this case, resource units within one TTI may be indexed by frequency first and time second principle.

Figure 9:
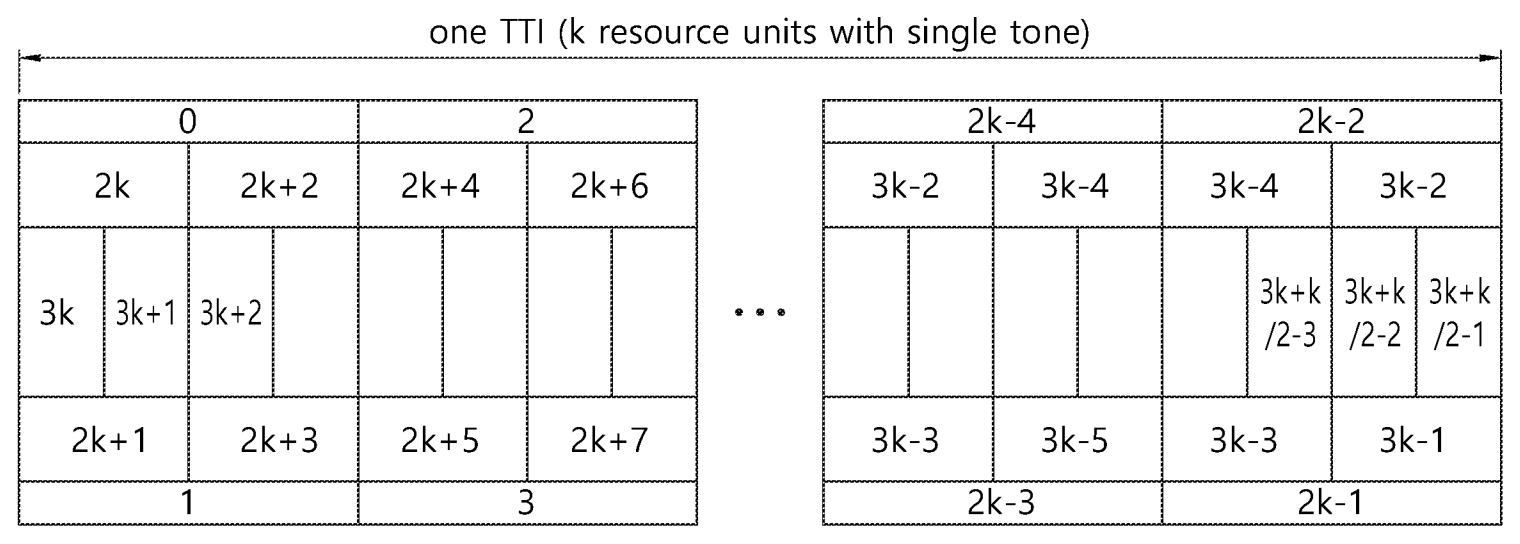

FIG. 9 shows another example of resource units for PUSCH transmission according to an embodiment of the present invention. One TTI may include multiple resource units and one TB may be scheduled over multiple resource units. In this case, continuous resource unit allocation in frequency or in tone may be desired with hopping. Accordingly, the resource units may be index from the smallest resource unit to the largest resource unit. Referring to FIG. 9, resource units are index from resource units with single tone by frequency first and time second (0, 1, 2, 3 . . . ), and resource units with two tones by frequency first and time second (2 k, 2k+1, 2 k+2, 2 k+3 . . . ), and resource units with four tones by frequency first and time second (3 k, 3k+1, 3 k+2, 3 k+3 . . . ). Resource allocation may be based on contiguous allocation using compact format. In this case, the TB size schedulable in one TTI may be different based on number of tones used or number of resource units scheduled.

Further, in order to minimize PAPR/cubic metric (CM), repetition may occur in symbol level, TTI level and/or resource unit levels. In this case, the resource mapping within one resource unit may consist of multiple symbol repetitions with multiple symbols.

Alternatively, resource units may be defined per number of tones, and resource units per each number of tones may be overlapped.

Figure 10:
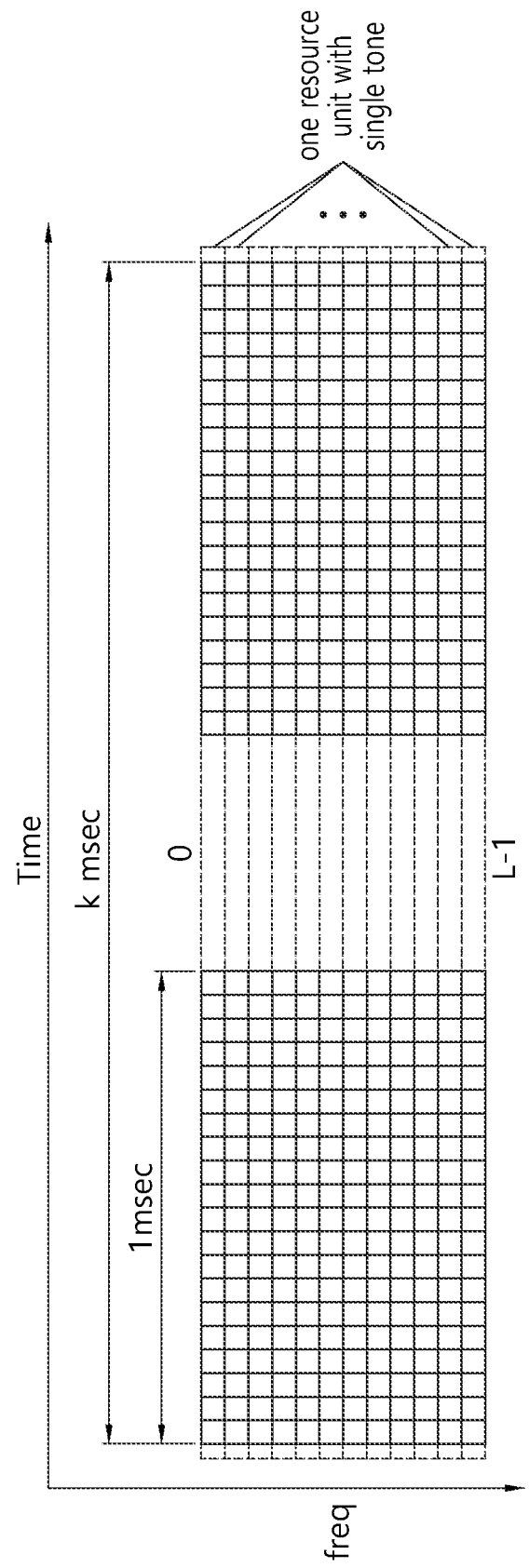
FIG. 10 shows another example of resource units for PUSCH transmission according to an embodiment of the present invention.

FIG. 10 shows another example of resource units for PUSCH transmission according to an embodiment of the present invention. Referring to FIG. 10, one resource unit for PUSCH transmission includes a single tone across k ms. Resource units are indexed from 0 to L−1.

Figure 11:
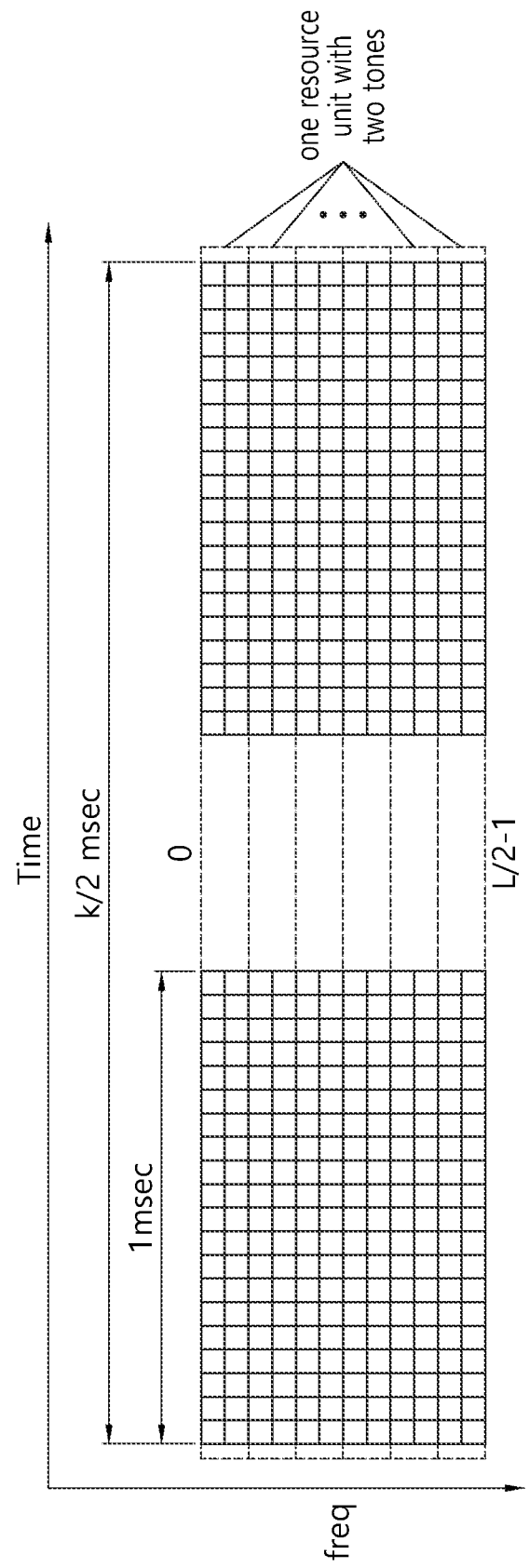
FIG. 11 shows another example of resource units for PUSCH transmission according to an embodiment of the present invention.

FIG. 11 shows another example of resource units for PUSCH transmission according to an embodiment of the present invention. Referring to FIG. 11, one resource unit for PUSCH transmission includes two tones across k/2 ms. Resource units are indexed from 0 to L/2−1.

Referring to FIGS. 10 and 11, when more than one tone is used for PUSCH transmission, the length of resource unit in time may be adapted to include the same number of REs to carry the minimum TBS. That is, in FIG. 10, a length of one resource unit with single tone in time is k, whereas, in FIG. 11, a length of one resource unit with two tones in time is k/2.

The index of resource unit in frequency may be mapped per each number of tones, e.g. L resource units in frequency domain for single tone (L=12 in 15 kHz subcarrier spacing, L=48 in 3.75 kHz subcarrier spacing). Different number of tones may be multiplexed by TDM A cell-specific configuration of {number of subcarriers, duration, periodicity, offset} may be configured (one or more parameters may be given with default values). Alternatively, Different number of tones may be multiplexed by FDM. A cell-specific configuration of {number of subcarrier/tones, number of resource units in frequency, starting tone index, end tone index} may be configured. Hybrid of TDM and FDM may also be considered.

Depending on the number of available number of resource units in frequency domain, the size of resource allocation can be different. To avoid the change of size of resource allocation, one resource unit may cover both time domain and frequency domain. For example, resource units within L subcarriers in k ms may be used for resource allocation in a continuous resource mapping manner. Alternatively, starting tone index, among L subcarriers which is the number of tones used for transmission, may be used. L may be semi-statically configured. In other words, when one resource unit consists of multiple tones, resource unit may start in any tone index rather than fixed in a few tone indices.

Alternatively, the number of tones and starting tone index may be jointly indicated. Or, number of tones and the starting tone index may be indicated separately. For example, if 4 bit is used for resource allocation in frequency domain, one example is as follows. The following example may be applied to a case that the UE is configured with 15 kHz spacing. The following example may also support both single and multiple tones. The bit size may be different if a UE is configured with 3.75 kHz subcarrier spacing.

[0 0 0 0]=12 subcarriers are allocated

[0 0 0 1]=single tone is allocated (MSB=0), 2 bits except for two most significant bits (MSBs) may be used for tone index (4 possible tone indices).

[1 0 0 0]=four tones are allocated (two MSB=1 0), 1 bit except for the first three bits may be used for starting tone index (2 possible locations)

[1 1 1 0]=eight tones are allocated (two MSB=1 1), 1 bit except for the first three bits may be used for starting tone index (2 possible locations)

Another example is that 0 to 11 may be allocated for starting subcarrier index in single tone case, 12 to 21 to may be allocated in 3 tones case, and so on.

If a UE is configured with 3.75 kHz subcarrier spacing, multiple tone transmission may also be configured. If a UE with 3.75 kHz subcarrier spacing is not be able to configured with multi tone transmission, the resource allocation may be common between 3.75 kHz and 15 kHz subcarrier spacing, and the total number of resource allocation entries cover 48 entries where some are reserved for 15 kHz. If the UE is configured with multiple tone transmission, depending on the subcarrier spacing in single tone, resource allocation size for UL grant may be different.

However, in Msg3, it is important to have the same size between 3.75 kHz and 15 kHz subcarrier spacing for carrier carrying UL grant in random access response (RAR), as a UE does not know which subcarrier spacing is used. For that, resource allocation between 3.75 kHz and 15 kHz subcarrier spacing may be aligned, assuming both can be scheduled with multi tone transmissions (e.g. 0 to 47 for single tone for starting subcarrier index, 48 to 57 to 3 tone transmissions, and so on).

Alternatively, when 3.75 kHz is configured in Msg 3, the resource allocation flexibility may be restricted, in which case the initial starting subcarrier index may be configured in SIB per physical random access channel (PRACH) resource set and only limited number of subcarrier indices may be dynamically indicated by UL grant in RAR. For example, the starting subcarrier index may be configured as 10 and the resource allocation may be dynamically selected from 10 to 21. This may be useful in case of FDM among different coverage levels. Alternatively, the total required resource allocation states for single tone may be set as 66 with 3.75 kHz subcarrier spacing and 30 for 15 kHz subcarrier spacing. To reduce the bit size, it may be assumed that 2 states are not used in single tone with 3.75 kHz subcarrier spacing. For example, two starting subcarrier indices with 3 (or 6) tones may not be supported or two starting subcarrier indices with single tone may not be supported.

In modulation and coding scheme (MCS)/TBS, the modulation of pi/2 BPSK or pi/4 QPSK in addition to code rate needs to be signaled. As pi/2 BPSK offers lower spectral efficiency, it is suggested to add a few more entries with pi/2 BPSK modulation schemes.

Another consideration for UL transmission may be scheduling window, which may be used to determine the starting time of any UL transmission or only applicable to PUSCH data transmission.

Separate configuration per coverage level and/or per data or ACK/NACK may be considered. In terms of indicating timing, it may be a multiple of scheduling window timing. The starting value may be larger than 8 since the last subframe of control channel. In this case, if the gap between the last control channel repetition and the first subframe of the next scheduling window is less than 8, the index may be counted from the second next scheduling window. Otherwise, the gap may start from the first scheduling window. Alternatively, it may always be started from the first available scheduling window. In this case, the network may be responsible to make it sure that the timing gap is greater than 8. When the timing is less than the required processing time, a UE may drop PUSCH transmission (the similar behavior may be applied to other channels as well).

In terms of gap, it may be a multiple of scheduling window periodicity. Scheduling window may be configured with periodicity, offset and/or duration.

Alternatively, scheduling window may be implicitly determined by the size of resource unit per number of tones. Starting from SFN=0 with slot index 0, resource unit may be used implicitly for determining scheduling unit. This may allow UEs with the same number of tones scheduled being aligned. Otherwise, the starting time of one UL transmission may not be aligned with resource unit size (in other words, it may start in any time).

If aperiodic channel state information (CSI) is supported, two approaches may be considered.

(1) Option 1: Uplink control information (UCI) piggyback may be supported.

Aperiodic CSI may be triggered in DCI. If M=12, legacy piggyback mechanism may be used. Otherwise, UCI may be transmitted in the last subframe of resource unit, and the last subframe may be rate matched for data transmission. One subframe may be used for transmitting UCI, and the UCI may be encoded in a repetition coding with no CRC. In other words, different UL transmission using shortened resource unit may be used, and the last subframe may carry UCI similar to ACK/NACK transmission mechanism (i.e. No CRC, repetition encoding, etc.). If one subframe is too large, one slot may be used for UCI piggyback. The overall concept is not to support UCI piggyback per subframe, rather it may be treated as if a separate transmission, where the resource in terms of time/frequency may be shared with regular PUSCH transmission.

Another approach for UCI piggyback is that UCI may be added in the last OFDM symbol of a resource unit. If multiple resource units are scheduled, the last resource unit may be used for UCI piggyback. This is to minimize the impact on data. If the last symbol is punctured due to, e.g. for SRS transmission, the second last OFDM symbol may be used for UCI piggyback. If the last symbol is not sufficient to transmit UCI with the desired code rate (e.g. ⅓ repetition code), the second last OFDM symbol may also be used. In other words, the mapping of UCI starts from the last OFDM symbol towards the earlier OFDM symbol. Another approach is that UCI may be mapped to a few OFDM symbols starting from the last OFDM symbol, though the mapping starts from the earliest OFDM symbol in time domain. As tail-biting convolutional code (TBCC) is used, information may be carried in the first part of transmission. In that sense, it may be desirable to puncture the last OFDM symbols to minimize the impact on data transmission. Another approach is that a fixed number of OFDM symbols may be reserved in a resource unit, and data may be rate matched if aperiodic CSI is triggered. For example, if 3 bits UCI is transmitted, totally 5 OFDM symbols may be assumed in case QPSK is used, and 10 OFDM symbols may be assumed in case pi/2 BPSK is used.

With the approach described above, in a single tone with pi/2 BPSK, the first OFDM symbol next/previous OFDM symbol to DM-RS may be reserved for 10 slots (for pi/4 QPSK, 5 slots are assumed). For 3 tone transmissions, 2 slots may be assumed. For 6 tone transmissions, 1 slot may be assumed. For 12 tone transmissions, 1 slot may be assumed. The remaining REs in the OFDM symbol reserved for UCI may be used for data transmission. Otherwise, the UCI may be repeated in the same ODFM symbol. Different behavior from current procedure is to perform rate matching around UCI REs to minimize the impact on data transmission. To minimize the impact, OFDM symbols used for UCI may be placed in the end of resource units.

(2) Option 2: Similar to PDCCH order, a special setting to trigger aperiodic CSI may be used. UCI may be carried as a payload.

In terms of transmitting aperiodic CSI, either aperiodic CSI based on NB—RS may be used or RSRP measurement on the serving cell may be reported. If RSRP is reported, the value range may be large. For that, only PRACH CE level based on the RSRP measurement may be reported which can be done with 2 bits.

If UCI piggyback of CSI is used, the maximum bit size of CQI feedback may be 3 or 2 bits. UCI piggyback may be used to be carried over repetition as well.

Another approach is that aperiodic CSI may always be transmitted with 12 subcarriers with only legacy piggyback mechanism. This implies that single tone transmission or less than 12 subcarriers may not support UCI piggyback. Alternatively, legacy behavior may be used assuming that maximum RE of PUSCH is restricted for the scheduled PUSCH number of tones.

Second, a resource unit definition for ACK/NACK transmission according to an embodiment of the present invention is described. The following shows some examples of the resource unit for ACK/NACK transmission.

(1) 12 subcarriers in 1 ms in DL and 1 subcarrier in X ms in UL: if this resource unit is used, UL resource unit length is X times longer than DL resource unit length.

(2) K subcarriers in m ms in DL and 1 subcarrier in X ms in UL (3) 1 subcarrier in 1 ms in both DL and UL (4) K subcarriers in 1 ms in DL and 1 subcarrier in 1 ms in UL Depending on the definition of the resource unit, the number of NB-IoT DL carriers, and the number of NB-IoT UL carriers capable of ACK/NACK transmission, the number of UEs which can be multiplexed at the same time on the same resource may be defined. For example, regardless of the definition of the resource unit, if the minimum size of scheduling of PDSCH is 1 DL resource unit and the minimum size of transmission of ACK/NACK transmission is 1 UL resource unit, one of the following options may be considered.

(1) Option 1: Only one UE may always be allocated to the resource for ACK/NACK transmission corresponding to one PDSCH (1 bit transmission in one resource unit). In such case, if the first example of the definition of the resource unit (i.e. 12 subcarriers in 1 ms in DL and 1 subcarrier in X ms in UL) or the second example of the definition of the resource unit (i.e. K subcarriers in m ms in DL and 1 subcarrier in X ms in UL), FDM with other UL transmissions, such as other ACK/NACK transmission or data transmission, may be considered.

(2) Option 2: Multiple UEs may be allocated to the resource for ACK/NACK transmission, as 1 UL resource unit can accommodate more than one ACK/NACK transmissions. In such case, ACK/NACK for multiple UEs may be multiplexed by code division multiplexing (CDM). Or, ACK/NACK for multiple UEs may be multiplexed by time division multiplexing (TDM) by dividing one UL resource unit into sub-ACK/NACK resource unit.

(3) Option 3: Smaller granularity of resource unit may be determined for ACK/NACK transmission which is different from resource unit for data transmission. Smaller granularity of resource unit may be referred to as sub-ACK/NACK resource unit. In such case, ACK/NACK transmission may start in the middle of one UL resource unit.

If option 2 or 3 described above is used, there may be multiple UEs corresponding to the same ACK/NACK transmission timing. In such case, for example, ceil (Max_Num_Subcarrier/K) or Max_Num_Subcarrier (which can be corresponding to the same NB-IoT UL carrier) may be multiplexed by either of CDM, TDM or frequency division multiplexing (FDM).

Option 3 will be described in detail. The question of the resource unit for NB-IoT may be whether or not to use the same resource unit for ACK/NACK transmission as data transmission. If the same resource unit is used for ACK/NACK transmission and data transmission, overall latency may increase. For example, if single tone transmission is used, one resource unit may be length of 12 or 10 or 40 or 20 or 8 ms (and 12 subframes). In other words, the resource unit duration may be k ms, and k may be one of among {8, 10, 12, 20, 40}. In such case, if CDM among different ACK/NACK transmissions are not achieved, to transmit one bit, overall about 168 REs (or 168 repetitions) may be used. This type of repetition may be necessary only for UEs with extreme coverage. However, it may be very excessive for some UEs with relatively good coverage. In that sense, the basic resource unit may be defined based on coverage level. For example, if there are three coverage levels, the following approach (or similar approaches) may be used as an example or in principle.

(1) Coverage level 1: If CDM or multiplexing in the same resource among multiple UEs are not used, 1 ms with single or multiple tones may be assumed to be a sub-ACK/NACK resource unit. Since CDM is not used, selection of the sub-ACK/NACK resource unit may be used to multiplex multiple UEs. Depending on resource of control channel (to schedule DL traffic) or resource of DL transmission, the resource for ACK/NACK transmission may be selected.

For one of mapping mechanisms, the resource for ACK/NACK transmission may be selected based on starting (E)CCE or starting index of control channel transmission. If CCE or multiplexing of different control channels are used, the starting resource index of control channel may be used to select the sub-ACK/NACK resource unit within one resource unit.

Figure 12:
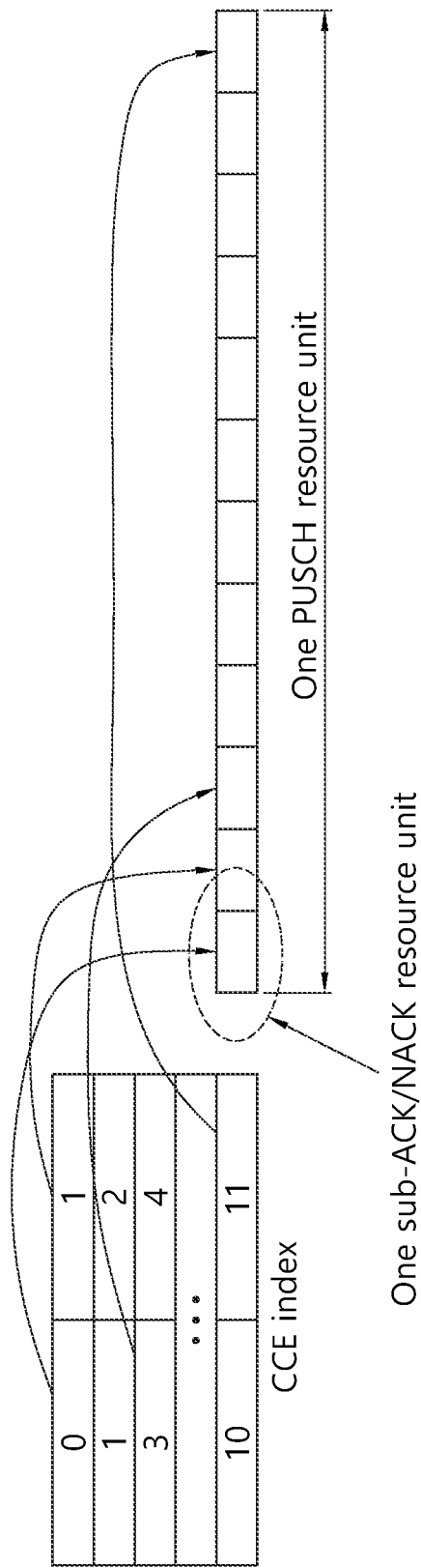
FIG. 12 shows an example of sub-ACK/NACK resource unit according to an embodiment of the present invention.

FIG. 12 shows an example of sub-ACK/NACK resource unit according to an embodiment of the present invention. Referring to FIG. 12, in one PUSCH resource unit, there are multiple sub-ACK/NACK resource units, and each of the sub-ACK/NACK resource units are selected based on CCE index.

Figure 13:
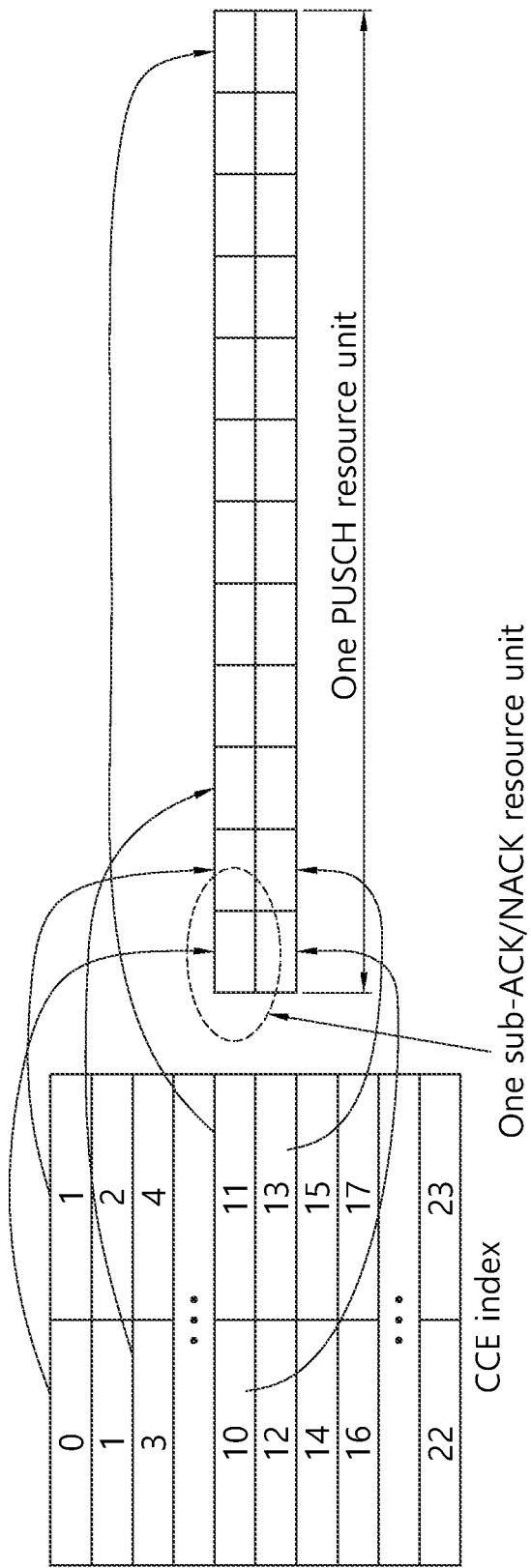
FIG. 13 shows another example of sub-ACK/NACK resource unit according to an embodiment of the present invention.

FIG. 13 shows another example of sub-ACK/NACK resource unit according to an embodiment of the present invention. Referring to FIG. 13, if multiple tones are available for ACK/NACK transmission, the resource may be determined from the lowest (or highest) tone index) and then move to the next tone.

Alternatively, ACK/NACK resources may be mapped from the frequency first and time next. In this case, the maximum number of tones usable for ACK/NACK transmission resource needs to be configured in prior via higher layer signaling or predefined. Alternatively, ACK/NACK resources may be mapped based on location (in terms of time or frequency) of starting transmission of data channel. Alternatively, ACK/NACK resources may be mapped based on a gap between control channel and data channel. For example, if control channel indicates the gap between two channels for better TDM multiplexing, the gap may be used to determine the time resource or sub-ACK/NACK resource unit index within one PUSCH resource unit. Alternatively, ACK/NACK resources may be mapped based on UE-ID or some other higher layer configuration.

(2) Coverage level 2: Similar mechanism as coverage level 1 may be considered. However, in coverage level 2, the sub-ACK/NACK resource unit may be larger than that of coverage level 1. To allow multiplexing, the same sub-ACK/NACK resource unit may be used regardless of coverage level. In this case, some repetition may be necessary which occur in PUSCH resource unit (i.e. discontinuous repetition across PUSCH resource units).

(3) Coverage level 3: Similar mechanism as coverage level 1 may be considered. Also, the same resource unit size as PUSCH resource unit may be used. In this case, similar mechanism to schedule PUSCH may be considered. For example, explicit time resource may be dynamically indicated from DCI.

In order to allow efficient channel estimation and reasonable amount of resource, one resource unit for multiplexing multiple ACK/NACK transmissions may be determined as follows. If a single tone is used for ACK/NACK transmission, m*k subframes may be one resource unit. m is the number of subframes used for one sub-ACK/NACK resource unit. For example, m=4, k=12. If repetition or more than m REs are needed for ACK/NACK transmission for a UE, repetition across resource units are used. If multiple tones are used for ACK/NACK transmission, min (r, m)*floor (m/floor (12/1))*k subframes may be one resource unit. r is the number of minimum repetition in a coverage level. In other words, different size of resource unit may be used per coverage level.

Figure 14:
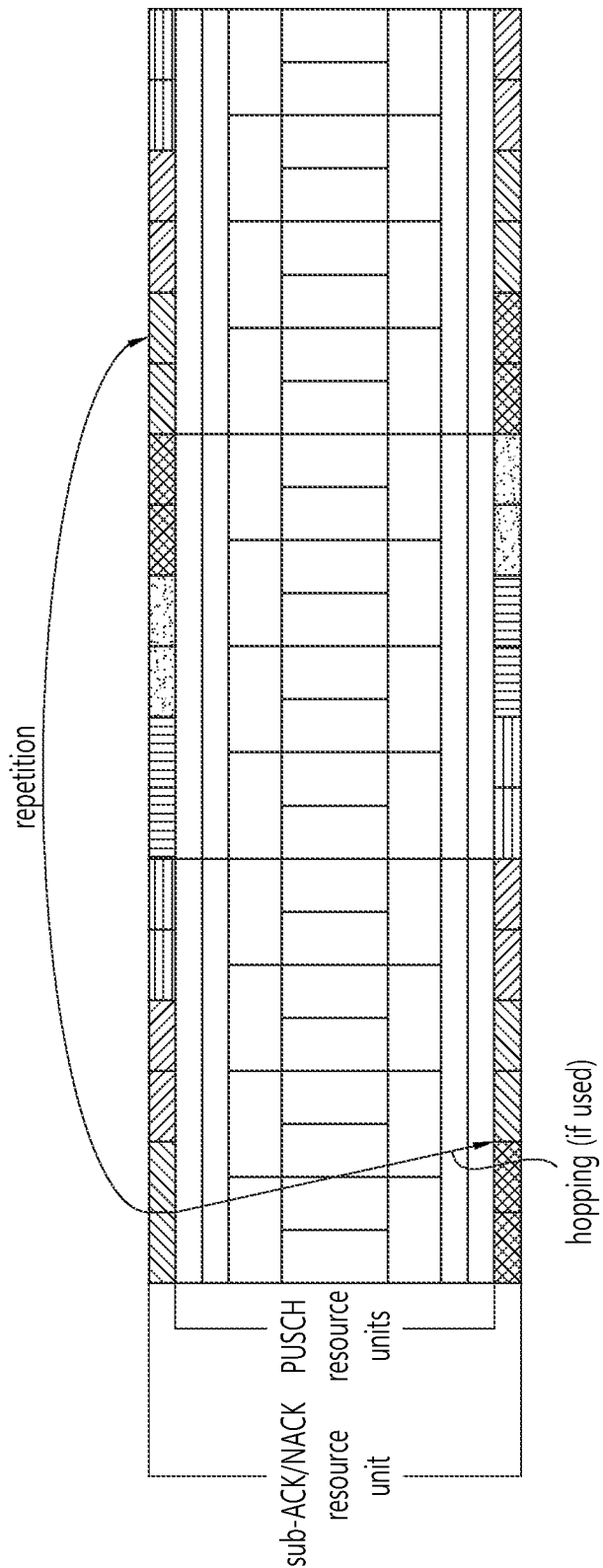
FIG. 14 shows another example of sub-ACK/NACK resource unit according to an embodiment of the present invention.

FIG. 14 shows another example of sub-ACK/NACK resource unit according to an embodiment of the present invention. Referring to FIG. 14, one tone (sub-ACK/NACK resource unit) in each side within 180 kHz may be reserved for ACK/NACK transmission. When frequency for ACK/NACK transmission is reserved, slot hopping or subframe hopping or multiple-subframes hopping may be considered. Given that only single tone is used for ACK/NACK transmission and the number of REs for DM-RS is also limited, multiple-subframes hopping rather than slot level hopping or subframe level hopping may be preferred. If frequency hopping is used, 2*m*12 REs are used for one ACK/NACK transmission in one ACK/NACK resource unit. Repetition may occur across ACK/NACK resource units. There may be multiple PUSCH resource units corresponding to one ACK/NACK resource unit. Furthermore, depending on the number of tones used for PUSCH transmission, the shorter resource unit size in time may be used. In such case, more PUSCH resource units may be formed within one ACK/NACK resource unit. Furthermore, if 3.75 kHz is used for ACK/NACK transmission, the duration becomes about 4× times. In this case, more PUSCH resource units may be formed within one ACK/NACK resource unit. The ACK/NACK transmission may start at the first ACK/NACK resource unit after k ms since the last subframe of PDSCH transmission or last subframe of last PDSCH resource unit where PDSCH is transmitted. In FDD, k=4.

Hereinafter, various aspects of ACK/NACK transmission by using the new resource unit according to an embodiment of the present invention will be described below.

(1) TDM of ACK/NACK Transmission and Data Transmission

When resource unit for ACK/NACK transmission is smaller than resource unit for data transmission (i.e. either option 2 or option 3 described above), the usable ACK/NACK resource to allow possible UE multiplexing may be multiplexed via FDM or TDM. When FDM is used for ACK/NACK resource multiplexing, to restrict the impact on scheduling of PUSCH, some TDM restriction of ACK/NACK resource may be considered.

For example, a few subframes in the beginning and the ending of M subframes may be reserved for ACK/NACK transmission, whereas other subframes may be used for K resource units for PUSCH transmission. For example, M=40 and one UL resource unit is 1 subcarrier*12 subframes. 3 UL resource unit may be used for PUSCH transmission and remaining subframes, i.e. each of 2 subframes in the beginning and ending, may be used for ACK/NACK transmission. In terms of timing, ACK/NACK transmission may occur in the first available ACK/NACK subframe after k subframe since the last transmission of DL data.

When multiple NB-IoT UL carriers are used, different ACK/NACK resources and data multiplexing per UL carrier may also be configured. From a UE perspective, if a UE hops across different NB-IoT UL carriers, the resource multiplexing between ACK/NACK and data may be aligned across NB-IoT UL carriers.

Considering potentially variable DL traffic volumes (or UL/DL ratio) per applications or depending on time (e.g. firmware update requires heavy DL), K number of UL resource units may be configured between ACK/NACK resources. K may be 0, 1, 2, . . . Max K. It may be assumed that one ACK/NACK resource contains at least m subframe (e.g. m=2) in time. By adjusting or configuring K, the number of ACK/NACK resource may be adjusted depending the DL traffic. If necessary, repetition may occur in consecutive ACK/NACK resource subframes. The number m can be larger than 2, e.g. 4 or 8, considering multiple-subframe channel estimation and I/Q combining.

K may be configured by the network via SIB signaling or higher layer signaling or via MIB. K may be a cell-specific value or coverage level specific value. K may also be UE-specific value. When K is configured, ACK/NACK resource may start from SFN=0 with subframe index=0, unless any offset is configured to start ACK/NACK resource. When K is configured per coverage level, the number m may be also different per coverage class, and also be configured per coverage class. If K is configured by cell-specifically, the number m may also be configured by cell-specifically. In other words, K and m may be configured together. Also, the usable number of tones may be configured. As default value, it may be assumed that 12 (for 15 kHz subcarrier spacing) and 48 (for 3.75 kHz subcarrier spacing) are usable by ACK/NACK transmission for FDM. In case of 3.75 kHz, some other default value considering frequency reuse less than 1 may also be considered.

Figure 15:
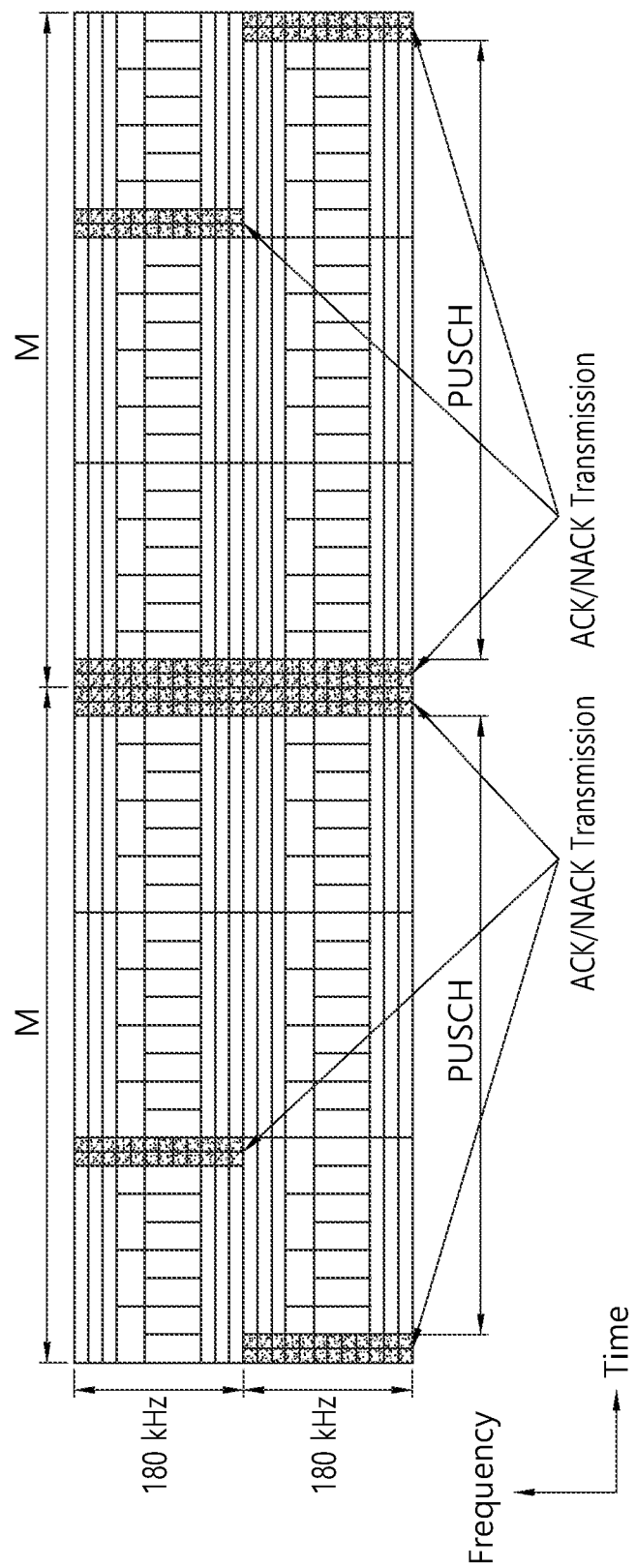
FIG. 15 shows an example of TDM between ACK/NACK transmission and data transmission according to an embodiment of the present invention.

FIG. 15 shows an example of TDM between ACK/NACK transmission and data transmission according to an embodiment of the present invention. Referring to FIG. 15, in the first NB-IoT UL carrier, two UL resource units are configured between ACK/NACK resources. A total of 4 subframes occupy ACK/NCK resources in M subframes. In the second NB-IoT UL carrier, ACK/NACK resources occupy each of 2 subframes in the beginning and ending of each M subframes, i.e. total of 4 subframes.

(2) FDM of ACK/NACK Transmission and Data Transmission

When TDM among multiple UEs for ACK/NACK transmissions are used, FDM of ACK/NACK resource and PUSCH resource may be considered. If more than one sub-ACK/NACK resource unit is needed for ACK/NACK transmission due to repetition, the repetition may occur continuously or discontinuously. Repetition may occur continuously starting from the first sub-ACK/NACK resource unit in case of continuous repetition. In this case, the collision among different UEs needs to be addressed by the network scheduling to avoid collision. Alternatively, repetition may occur in resource unit level, and multiple UEs may be multiplexed by using different sub-ACK/NACK resource unit. Considering that it is likely that DL transmissions among multiple UEs may also be multiplexed by TDM rather than FDM, continuous repetition may work.

When multiple NB-IoT UL carriers are used for NB-IoT UL transmission with FDM between ACK/NACK transmission and data transmission, ACK/NACK resource may be configured in multiple NB-IoT UL carriers rather than per NB-IoT carrier to allow more data resources. For example, ACK/NACK resource may be configured in every 'm' number of NB-IoT UL carrier at edge of 'm' NB-IoT UL carriers. Or, only one ACK/NACK resource may be configured in multiple configured NB-IoT UL carriers. Also, the number of subcarriers/tones usable for ACK/NACK resources may be configured as well (e.g. from 1 to a few subcarriers). The configuration may be given by SIB. If ACK/NACK resource is configured across more than one NB-IoT UL carrier, frequency retuning may be necessary to switch from one NB-IoT UL carrier to another NB-IoT UL carrier. When retuning is needed within one ACK/NACK transmission with repetition, some retuning latency may be considered by puncturing retuning gaps or not utilizing a slot or subframe.

Further, when FDM of ACK/NACK transmission and data transmission is used, TDM may be used for DL transmissions among multiple UEs in different coverage class. In this case, ACK/NACK transmission among multiple UEs in TDM may be desirable. In terms of control channel, the maximum repetition level R may be defined per coverage class, and a UE may monitor multiple repetition numbers, such as R/4, R/2, R. The control channel may be transmitted with different repetition number and a UE may monitor multiple starting subframes/instances within one monitoring occasion which is defined by the maximum repetition level R. ACK/NACK transmission may start at n+k (e.g. k=4), and n is the last subframe where PDSCH is transmitted.

If FDM between data transmissions of multiple UE is used, some type of multiplexing among multiple ACK/NACK transmissions may be necessary. FDM among multiple ACK/NACKs may be considered aligned with data multiplexing.

(3) Collision Handling Between ACK/NACK Transmission and Data Transmission Via Scheduling For data and ACK/NACK resource sharing, multiplexing among PUSCH and PUCCH may be done based on scheduling. ACK/NACK may be transmitted in any resource by using FDM or TDM or CDM and the collision between PUSCH and ACK/NACK transmission may be avoided by the network scheduling. In this case, the resource used for ACK/NACK transmission and/or data transmission including frequency and time information may be indicated dynamically. Time information may include delay between UL grant and the actual UL transmission (for data transmission case) and/or between the last subframe of PDSCH transmission and actual ACK/NACK transmission (for ACK/NACK transmission case). If scheduling is used for multiplexing of ACK/NACK resource and data resource, the subcarrier index or tone index of ACK/NACK resource may be indicated dynamically in DL grant, in order to avoid potential collision. In this case, the timing may be determined implicitly. The subcarrier index or tone index of ACK/NACK resource may be indicated from a subset of tones/subcarriers usable for ACK/NACK transmission. Tones/subcarriers usable for ACK/NACK transmission may be semi-statically configured per UE or per cell. The concept may be similar to ACK/NACK resource indictor (ARI).

(4) Hybrid of TDM and FDM

In terms of resource allocation or multiplexing between ACK/NACK transmission and data transmission, hybrid approach of (1) and (2) may be considered. In other words, for configuring ACK/NACK resource, at least one of the followings may be considered.

Periodicity of ACK/NACK resource

Duration of ACK/NACK resource in one period (i.e. how many subframes or resource units may be used for ACK/NACK resource in each period)

Offset of ACK/NACK resource

Number of subcarriers used for one ACK/NACK transmission

Number of total subcarriers usable for ACK/NACK transmission (or the offset in frequency where PUSCH should not be mapped)

The configuration may be given per coverage class, and/or per NB-IoT UL carrier and/or per legacy UL carrier and/or the total NB-IoT UL carriers and/or per UE.

Figure 16:
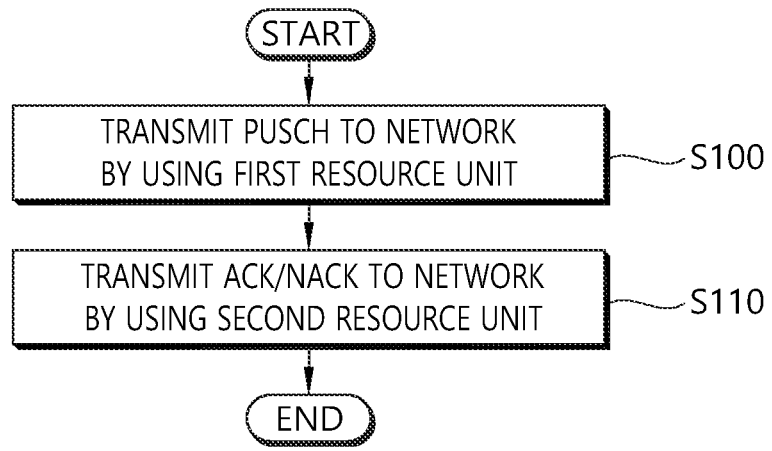
FIG. 16 shows a method for performing transmission by a NB-IoT UE according to an embodiment of the present invention.

FIG. 16 shows a method for performing transmission by a NB-IoT UE according to an embodiment of the present invention. The embodiments of the present invention described above may be applied to this embodiment of the present invention.

In step S100, the NB-IoT UE transmits a PUSCH to a network by using a first resource unit. In step S110, the NB-IoT UE transmits ACK/NACK to the network by using a second resource unit. The first resource unit consists of a first number of REs within a first tone in frequency domain and a first time interval in time domain. The second resource unit consist of a second number of REs within a second tone in frequency domain and a second time interval in time domain. The second number is smaller than the first number.

The first resource unit may correspond to the PUSCH resource unit described above. The first resource unit may carry a minimum TBS for transmission of the PUSCH. A number of the first tone may be one. In this case, the first resource unit may consist of the first number of REs within a single tone in frequency domain and 8 ms in time domain. The single tone may correspond to a single 15 kHz subcarrier. Alternatively, a number of the first tone may be more than one. In this case, the first time interval in time domain may be adapted to include the first number of REs according to the number of the first tone. The first resource unit may consist of the first number of REs within 12 tones in frequency domain and 1 ms in time domain. The first resource unit may be defined per number of the first tone, and a same RE may be included in each of the first resource unit per number of the first tone.

The second resource unit may correspond to sub-ACK/NACK resource unit described above. The second resource unit may be allocated to ACK/NACK transmission of one UE. The second resource unit may correspond to ACK/NACK transmission of one PDSCH. A number of second tone may be one. The second resource unit may be allocated at middle of the first unit. An index of the second tone may be indicated from a subset of tones usable for ACK/NACK transmission.

Figure 17:
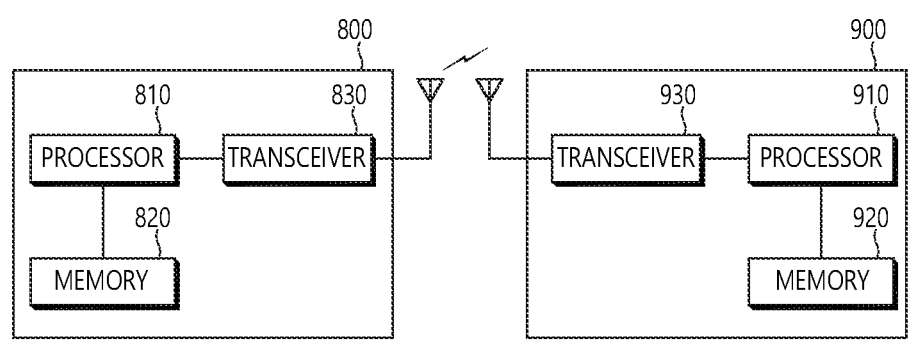
FIG. 17 shows a wireless communication system to implement an embodiment of the present invention.

FIG. 17 shows a wireless communication system to implement an embodiment of the present invention.

An eNB 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a network node in a wireless communication system, the method comprising:
   transmitting, to a user equipment (UE), information for a number of repetitions of one or more first resource units and information for a number of repetitions of one or more second resource units;
   receiving, from the UE, uplink (UL) data on the one or more first resource units repetitively used by the number of repetitions of the one or more first resource units; and
   receiving, from the UE, an acknowledgement/negative-acknowledgement (ACK/NACK) signal on the one or more second resource units repetitively used by the number of repetition of the one or more second resource units,
   wherein each of the one or more first resource units consists of a first number of resource elements (REs) within one or more subcarriers in frequency domain and a first time interval in time domain,
   wherein each of the one or more second resource units consists of a second number of REs within a single subcarrier in frequency domain and a second time interval in time domain, and
   wherein the second number of REs is smaller than the first number of REs.

2. The method of claim 1, wherein the one or more first resource units carry a minimum transport block size (TBS) for transmission of a physical uplink shared channel (PUSCH).

3. The method of claim 1, wherein a number of the one or more subcarriers is one.

4. The method of claim 3, wherein the one or more first resource units consist of the first number of REs within a single subcarrier in frequency domain and 8 ms in time domain.

5. The method of claim 3, wherein the one or more first resource units consist of the first number of REs within a single 15 kHz subcarrier in frequency domain and 8 ms in time domain.

6. The method of claim 1, wherein a number of the one or more subcarriers is more than one.

7. The method of claim 6, wherein the first time interval in time domain includes the first number of REs according to the number of the one or more subcarriers.

8. The method of claim 6, wherein the one or more first resource units consist of the first number of REs within 12 subcarriers in frequency domain and 1 ms in time domain.

9. The method of claim 1, wherein the one or more first resource units are defined for each of the one or more subcarriers, and
   wherein a same number of REs is included in each of the one or more first resource units.

10. The method of claim 1, wherein the one or more second resource units are allocated to ACK/NACK transmission of a UE.

11. The method of claim 1, wherein the one or more second resource units are related to ACK/NACK transmission of a physical downlink shared channel (PDSCH).

12. The method of claim 1, wherein the one or more second resource units are allocated in a middle of the one or more first resource units.

13. The method of claim 1, wherein an index of the single subcarrier is indicated from a subset of subcarriers usable for ACK/NACK transmission.

14. A network node in a wireless communication system, the NB-IoT UE comprising:
   a memory;
   a transceiver; and
   at least one processor, coupled to the memory and the transceiver, the processor configured to:
   control the transceiver to transmit, to a user equipment (UE), information for a number of repetitions of one or more first resource units and information for a number of repetitions of one or more second resource units;
   control the transceiver to receive, from the UE, uplink (UL) data on the one or more first resource units repetitively used by the number of repetitions of the one or more first resource units; and
   control the transceiver to receive, from the UE, an acknowledgement/negative-acknowledgement (ACK/NACK) signal on the one or more second resource units repetitively used by the number of repetition of the one or more second resource units,
   wherein each of the one or more first resource units consists of a first number of resource elements (REs) within one or more subcarriers in frequency domain and a first time interval in time domain,
   wherein each of the one or more second resource units consists of a second number of REs within a single subcarrier in frequency domain and a second time interval in time domain, and wherein the second number of REs is smaller than the first number of REs.

15. A method performed by a user equipment (UE) in a wireless communication system, the method comprising:
   receiving, from a network, information for a number of repetitions of one or more first resource units and information for a number of repetitions of one or more second resource units;
   transmitting, to the network, uplink (UL) data using the one or more first resource units repetitively by the number of repetitions of the one or more first resource units; and
   transmitting, to the network, an acknowledgement/negative-acknowledgement (ACK/NACK) signal using the one or more second resource units repetitively by the number of repetitions of the one or more second resource units,
   wherein each of the one or more first resource units consists of a first number of resource elements (REs) within one or more subcarriers in frequency domain and a first time interval in time domain,
   wherein each of the one or more second resource units consists of a second number of REs within a single subcarrier in frequency domain and a second time interval in time domain, and
   wherein the second number of REs is smaller than the first number of REs.

16. The method of claim 15, wherein the one or more first resource units carry a minimum transport block size (TBS) for transmission of a physical uplink shared channel (PUSCH).

17. The method of claim 15, wherein the one or more first resource units consist of the first number of REs within a single subcarrier in frequency domain and 8 ms in time domain.

18. The method of claim 15, wherein the first time interval in time domain includes the first number of REs according to the number of the one or more subcarriers.

19. The method of claim 15, wherein the one or more first resource units consist of the first number of REs within 12 subcarriers in frequency domain and 1 ms in time domain.

20. The method of claim 15, wherein the one or more first resource units are defined for each of the one or more subcarriers, and
   wherein a same number of REs is included in each of the one or more first resource units.

* * * * *